United States Patent Office 3,518,689
Patented June 30, 1970

3,518,689
FREQUENCY-SENSITIVE CROSS-SCANNING ANTENNA
Jerry A. Algeo, Buena Park, and Jerome C. Hill, Fullerton, Calif., assignors to North American Rockwell Corporation, a corporation of Delaware
Filed Mar. 6, 1967, Ser. No. 621,007
Int. Cl. H01q *3/26, 13/00*
U.S. Cl. 343—778                                    3 Claims

ABSTRACT OF THE DISCLOSURE

A dual-mode electronically-scanning antenna comprising a matrix array of radiating elements, the rows of which matrix are fed by a first frequency-scanned feed and the columns of which are fed by a second frequency-scanned feed, whereby two separately controlled, mutually-angled, cross-scanning beams may be simultaneously provided. If desired, such beams may be linearly polarized in mutually orthogonal planes of polarization.

Cross-references to related applications

U.S. application Ser. No. 472,236, filed July 15, 1965, now Pat. No. 3,434,139 by Jerry A. Algeo for Frequency-Controlled Scanning Monopulse Antenna.

Background of the invention

The utilization of a doubly-dispersive frequency-scanned planar array of discrete radiating elements to provide a dual-plane scanning beam is known in the antenna art, being described, for example, in my above-noted copending application Ser. No. 472,236. In such an arrangement successive elements of each row of elements of the matrix, for example, are connected to successive points along a low-dispersive feedline, while an excitation end of such sucessive low-dispersive feedlines are connected to sucessive points along a highly dispersive feedline. By means of a frequency-scanned excitation applied to an input of the highly dispersive feedline, the resultant antenna beam describes a raster scan pattern as a function of frequency, the beam cyclically sweeping rapidly across the rows (in the direction of the highly dispersive feed array), while slowly scanning in the direction of the low-dispersive feedline array of a row.

In certain airborne radar systems applications, it is desired to perform several different functions for which different types of antenna scan patterns are employed. For example, in a forward-looking surveillance mode, an azimuthally-scanning antenna pattern may be employed in conjunction with a PPI display indicator, while for a terrain avoidance mode a fixed-heading, rapidly-nodding beam scanning pattern is employed to provide maneuver angle and range data concerning terrain obstacles ahead of a utilizing aircraft as shown in U.S. Pat. 3,119,582, issued Jan. 28, 1964, to R. E. Kaufmann. In a multimode antenna, such modes may be performed concomitantly on a time-shared basis. Prior-art types of such multimode systems, however, have relied upon an electromechanical device which physically drives a conventional antenna in a cross-scanning pattern or modified figure-eight pattern. The high physical inertias associated with such mechanically scanned devices limits the data rate obtainable for each mode of a time-multiplexed multimode pulsed energy system.

Although frequency-scanned antenna arrays have been employed in the prior-art for high-speed inertialess-scanning, such prior-art devices have been either dual-plane scanning single-beam systems (in normal single matrix applications) or multiple-matrix arrangements for providing single-plane scanning multiple beams. An example of a multiple-matrix arrangement is shown in U.S. Pat. 3,247,-512, issued Apr. 19, 1966, to Maurice Diamond for a Microwave Antenna, as being adapted for providing one or more beams of energy. Such a device employs two separate matrices of radiating elements, in the manner of two side-by-side antennas, each matrix comprising a planar array of parallel, mutually-spaced radiating waveguides having radiating slots formed therein and being connected to a feedline associated only with such matrix. These two planar matrices are then placed in a face-to-back or mutually parallel planar relationship with the parallel radiating waveguides of each at a crossed or mutually orthogonal orientation with those of the other, and sufficiently out of registry that the radiating slots of each matrix are interposed or disposed between the radiating elements of the other matrix. In such an arrangement only half the radiating slots presented in the physical aperture of the assembly, are energized by a given one of the feedlines. Also, care must be taken in design of Diamond's device that the slots of the outward array or matrix of parallel radiating waveguides produce a linear polarization always parallel to the longitudinal axes of such waveguides, and that the spacing between such waveguides is less than one-half the wavelength of the signal radiated from the other array, whereby that component of energy radiated from the second matrix which is polarized orthogonal to the waveguide elements of the first matrix is unattenuated and that component which is polarized parallel thereto is attenuated. In other words, the crossed waveguides of the two arrays act as polarized reflectors and cross-polarizers to separately form independent beams simultaneously, and with reduced "cross talk" between them, while being coupled, either sequentially or simultaneously, to a common source of excitation.

Such concept, however, imposes unnecessary design restraints upon a device with regard to the combinations of radiation state, radiator spacings, polarizations and microwave frequencies that may be employed. For example, neither of Diamond's two arrays may be cross-fed by two feeds for cross-scanning. Also, the use of a common source of excitation does not allow separate frequency control of two simultaneous beams for direction control of each independent of the other, for effective utilization in a dual mode system. Moreover, the cooperation with a common transmitter or source of scanning frequency for both arrays, together with a common receiver as taught by Diamond, is adapted to effective utilization in a dual mode system only on the basis of time-shared or duplexed operation.

Summary of the invention

By means of the concept of the subject invention a single cross-fed matrix of radiating elements are employed, whereby the above-noted disadvantages and limitations of the prior art are avoided.

In a preferred embodiment of the subject invention, there is provided a frequency-sentisive cross-scanning antenna comprising a planar matrix of radiating elements, the rows of which are fed by a first frequency-scanned feed for providing a first directionally-scanned energy beam and the columns of which are fed by a second frequency-scanned feed for providing a second directionally scanned energy beam, the feeds being adapted to be connected to separate sources of excitation for separate directional control of each beam, simultaneous with and independent of the other.

By means of the above-described arrangement a dual-mode system may be implemented, utilizing only a single matrix of radiating elements. Also, the simultaneous and separate control of the dual beams allows dual mode system operation without the necessity of time-sharing or duplexing. Further, unnecessary design restrictions as to permissible combinations of frequencies, spacing between waveguides, and polarizations are not imposed. Accordingly, it is an object of the subject invention to provide an improved multi-mode frequency-scanned antenna.

It is another object of the invention to provide a multi-mode frequency-scanned antenna employing a single common matrix.

It is still another object to provide a dual-beam frequency-scanned antenna matrix employing crossed feeds.

A further object is to provide a single common frequency-scanned antenna matrix for a multi-mode application, the separate modes of which may be separately controlled, each simultaneously with and independently of the other.

A still further object of the invention is to provide a multi-mode frequency-scanned antenna that is not subject to unnecessary design constraints in construction and utilization.

These and other objects of the invention will become more readily apparent from the following description, taken together with the accompanying drawings, in which:

Brief description of the drawings

In the figures, like reference characters refer to like parts.

Description of the preferred embodiment

Figure 1:
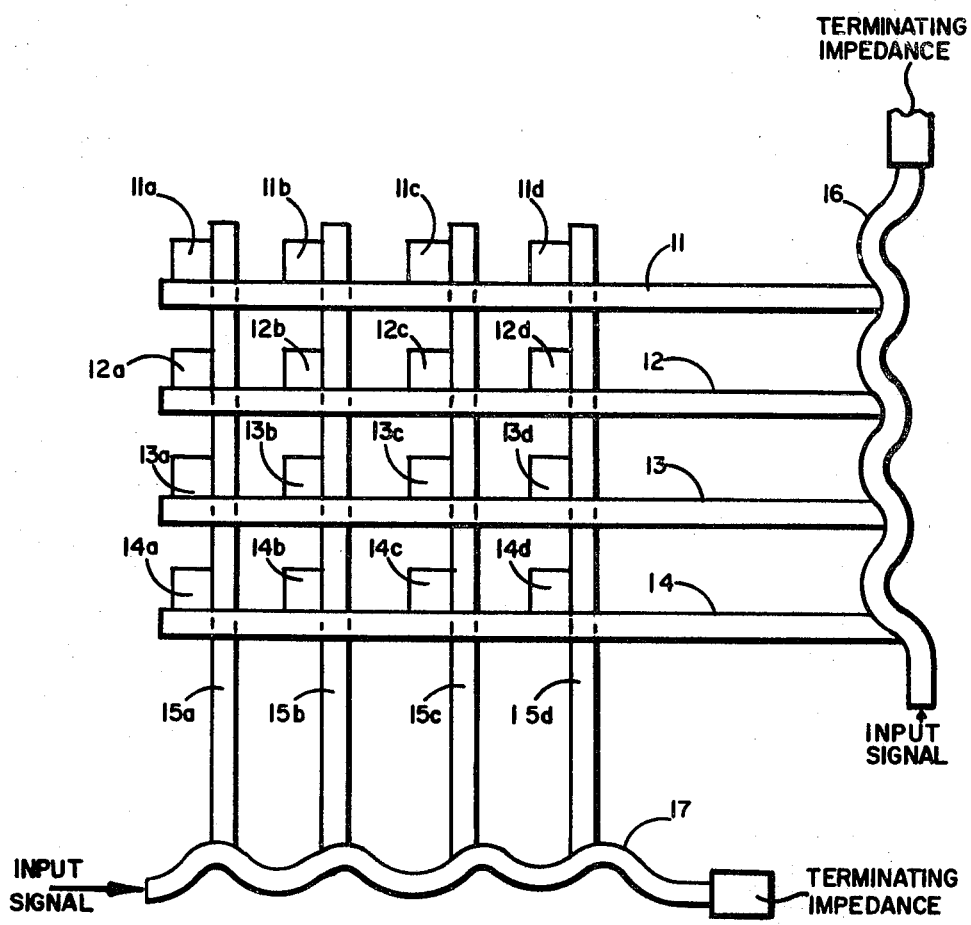
FIG. 1 is a schematic arrangement of a preferred embodiment of the invention, illustrating a cross-fed matrix.

Referring now to FIG. 1, there is illustrated a schematic arrangement of a preferred embodiment of the inventive concept. There is provided a coplanar matrix of radiating elements 11a, . . . 11d, . . . 13a, . . . 13d, arranged uniformly in rows and columns, the numeral of each reference character corresponding to a row and the letter associated with each reference character corresponding to a column. For example, reference numeral "11" corresponds to the first or top row and reference letter "a" corresponds to the first or leftmost column in the arrangement of FIG. 1. A first plurality of low-dispersive feeds 11, 12, 13 and 14 couples the matrix in rows of feedline arrays, each feed coupled to a corresponding row of the radiating elements of the matrix; and a second plurality of low-dispersive feeds 15a, 15b, 16c and 15d couples the matrix in columns of feedline arrays, each column feed coupled to a corresponding column of radiating elements. There are also provided two highly-dispersive, or sinuous, feedlines 16 and 17, a first one 16 having successive points therealong coupled to successive ones of the row array feeds 11, 12, 13 and 14 and the other sinuous feedline 17 having successive points coupled to successive points coupled to successive ones of the columnar array feeds 15a, 15b, 15c and 15d. Each of feedlines 16 and 17 has an input terminal, of course, the other terminal comprising a non-reflective impedance, as is well understood in the art.

Figure 2:
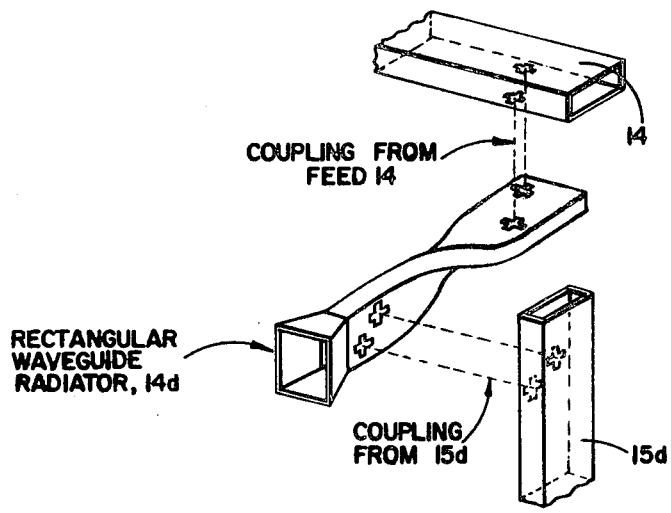
FIG. 2 is an exploded view of one arrangement of two crossed feed-lines in cooperation with a single common rectangular radiating waveguide.
Figure 3:
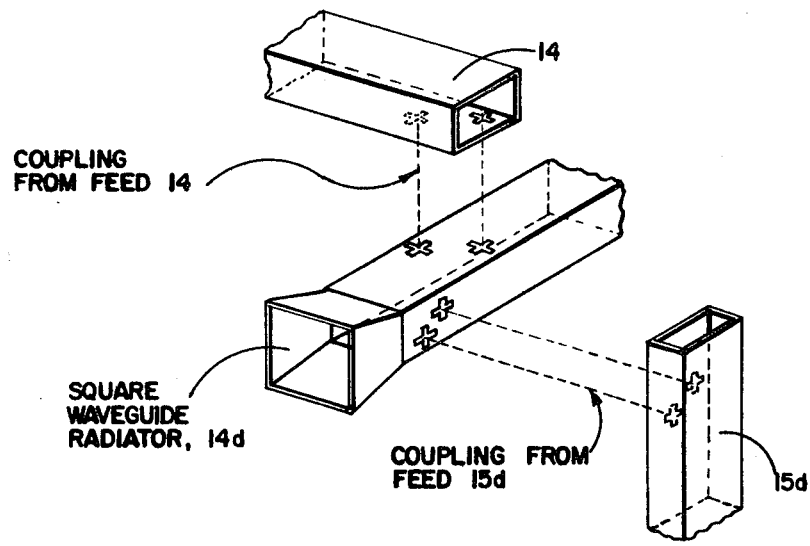
FIG. 3 is an exploded view of an alternate arrangement of two crossed feedlines in cooperation with a single common radiating waveguide of square cross-section.

Each of the radiating elements 10i, . . . 13i may be comprised of a rectangular waveguide radiator, while feedlines 11, 12, 13, 14, 15a, 15b, 15c and 15d may be rectangular waveguide sections, coupled to associated ones of the waveguide radiators by means of coupling slots in adjacent walls of the waveguide radiators and feedlines, as shown in FIGS. 2 and 3. In other words, the mutually parallel plurality of waveguide radiators are crossed with respect to the two mutually crossed sets of parallel feeds.

Where each of the waveguide radiators is rectangular in cross-section, a broadwall thereof may be coupled to a broadwall of each of two associated and mutually-crossed feedlines by the inclusion of a quarter turn of 90° twist in the waveguide radiator, about a longitudinal axis thereof, as shown more particularly in FIG. 2 for radiator 14d. In this way, a common mode of polarization may be transmitted by the waveguide radiator in response to each of the crossed feeds.

Where, however, each of the waveguide radiators employs a square cross-section, each of two continuous walls of which correspond to the broadwall of a mutually exclusive one of two-crossed feeds, then the quarter-twist is omitted from the waveguide radiator, as shown in FIG. 3 for radiator 14d; and mutually orthogonal linear polarizations are transmitted in response to excitations from the two feeds.

Because of the large-phase-versus-frequency dispersion associated with each of sinuous feedlines 16 and 17 (relative to that associated with feeds 11, 12, 13, 14, 15a, 15b, 15c and 15d) in FIG. 1, it is to be appreciated that a suitable frequency-scanned source applied to feedline 16 can be made to cause the matrix of elements to generate a beam pattern which scans rapidly in elevation with little appreciable motion in azimuth, while the application of a similar source to feedline 17 can be made to result in a beam pattern which scans in azimuth with little appreciable motion in elevation. Accordingly, the cross-fed matrix of waveguide radiators in FIG. 1 provide a cross-scanning antenna.

Because the mutually-crossed dual arrays of parallel feeds for the single cross-feed matrix are not utilized as polarization grids, unnecessary design restraints are not imposed upon the spacing between mutually parallel feeds. Also, because a single common matrix of radiators is employed without design restraints upon the spacing between parallel feeds thereof, unnecessary design restraints are not imposed upon the styles of polarization utilized by a given feed array or the combination of polarizations utilized by the dual arrays of parallel feeds. Moreover, because a single common matrix of radiators is employed by both feed arrays, no registration problems arise due to mechanical alignment between two separately fed and interlaced matrices, in correlating the boresight directions of each in a multimode system application. Accordingly, an improved electronically-scanned antenna has been disclosed.

Although the invention has been described and illustrated in detail, it is to be clearly understood that the same is by way of illustration and example only and is not to be taken by way of limitation the spirit and scope of this invention being limited only by the terms of the appended claims.

We claim:

1. A cross-scanning dual beam frequency-sensitive antenna comprising
    a single planar matrix of radiating elements;
    a first plurality of low-dispersive feeds, each feed coupled to a corresponding row of the radiating elements of said matrix;
    a second plurality of low-dispersive feeds, each feed coupled to a corresponding column of the radiating elements of said matrix;
    a first highly-dispersive feedline coupled to said first plurality of feedlines for feeding said rows of radiating elements; and
    a second highly dispersive feedline coupled to said second plurality of feed lines for feeding said columns of radiating elements.

2. A frequency-controlled, dual-plane scanning antenna for providing separately controllable cross-scanning dual beams, and comprising
    a single coplanar array of uniformly-spaced rows and columns of radiating elements;
    a like number of first feedlines as rows, each first feedline connected to feed a mutually exclusive one of said rows of radiating elements;

a like number of second feedlines as columns, each second feedline connected to feed a mutually exclusive one of said columns of radiating elements; and a third and a fourth feedline respectively connected to feed a mutually exclusive one of said first and second mentioned numbers of feedlines.

3. A frequency-controlled, dual-plane scanning antenna for providing separately controllable cross-scanning dual beams, and comprising a coplanar array of uniformly-spaced rows and columns of radiating elements;

a like number of first feedlines as rows, each first feedline connected to feed a mutually exclusive one of said rows of radiating elements;

a like number of second feedlines as columns, each second feedline connected to feed a mutually exclusive one of said columns of radiating elements; and a third and fourth feedline respectively connected to feed a mutually exclusive one of said first and second mentioned numbers of feedlines, said radiating elements being rectangular apertured elements for radiating linearly polarized energy, polarized in either of two mutually orthogonal polarization planes, and including directional coupler means for coupling a respective preselected polarization mode of a respective one of said first number and second number of feedlines to said apertured elements.

References Cited

UNITED STATES PATENTS

| | | | |
|---|---|---|---|
| 3,213,454 | 10/1965 | Ringenbach | 343—771 |
| 3,247,512 | 4/1966 | Diamond | 343—771 |
| 3,281,851 | 10/1966 | Goebels | 343—771 |

ELI LIEBERMAN, Primary Examiner

U.S. Cl. X.R.

343—854